United States Patent
Lin (10) Patent No.: US 10,511,854 B2
(45) Date of Patent: Dec. 17, 2019

(54) METHOD AND APPARATUS FOR BUILDING MOTION VECTOR LIST FOR MOTION VECTOR PREDICTION

(71) Applicant: HUAWEI TECHNOLOGIES CO., LTD., Shenzhen, Guangdong (CN)

(72) Inventor: Yongbing Lin, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/054,750

(22) Filed: Aug. 3, 2018

(65) Prior Publication Data

US 2018/0343467 A1    Nov. 29, 2018

Related U.S. Application Data

(63) Continuation of application No. 15/345,948, filed on Nov. 8, 2016, now Pat. No. 10,091,523, which is a (Continued)

(30) Foreign Application Priority Data

Oct. 8, 2012  (CN) .......................... 2012 1 0377579

(51) Int. Cl.
  *H04N 19/46* (2014.01)
  *H04N 19/52* (2014.01)
  (Continued)

(52) U.S. Cl.
  CPC .......... *H04N 19/52* (2014.11); *H04N 19/436* (2014.11); *H04N 19/46* (2014.11); *H04N 19/463* (2014.11); *H04N 19/105* (2014.11); *H04N 19/176* (2014.11)

(58) Field of Classification Search
  CPC ...... H04N 19/52; H04N 19/46; H04N 19/463; H04N 19/436; H04N 19/176; H04N 19/105
  (Continued)

(56) References Cited

U.S. PATENT DOCUMENTS

| 5,982,441 A | 11/1999 | Hurd et al. |
| 6,594,313 B1 | 7/2003 | Hazra et al. |

(Continued)

FOREIGN PATENT DOCUMENTS

| CA | 2765828 A1 | 12/2010 |
| CN | 1885948 A | 12/2006 |

(Continued)

OTHER PUBLICATIONS

Ismaeil et al, Efficient motion estimation using spatial and temporal motion vector prediciton (Year: 1999).*

(Continued)

*Primary Examiner* — Shan E Elahi
(74) *Attorney, Agent, or Firm* — James Anderson Harrison (57) ABSTRACT

Relating to the field of video coding, a method and an apparatus for building a motion vector list for motion vector prediction, which solve a problem of building motion vector lists of at least two PUs in a same coding unit in a serial manner, and improve the parallel processing capability. The method includes: obtaining spatial neighboring blocks of a current prediction block, where the current prediction block is located inside a current coding unit; determining available neighboring blocks of the current prediction block according to a partition manner of the current coding unit, where the available neighboring blocks are located outside the current coding unit; and obtaining motion vectors from the available neighboring blocks in a preset sequence according to motion (Continued)

vectors of the available neighboring blocks, and adding the obtained motion vectors to the motion vector list.

4 Claims, 5 Drawing Sheets

Related U.S. Application Data continuation of application No. 14/311,012, filed on Jun. 20, 2014, now Pat. No. 9,549,181, which is a continuation of application No. PCT/CN2013/073817, filed on Apr. 7, 2013.

(51) Int. Cl.
*H04N 19/463* (2014.01)
*H04N 19/436* (2014.01)
*H04N 19/105* (2014.01)
*H04N 19/176* (2014.01)

(58) Field of Classification Search
USPC .................................... 375/240.16
See application file for complete search history.

(56) References Cited

U.S. PATENT DOCUMENTS

| | | | |
|---|---|---|---|
| 7,280,700 B2* | 10/2007 | Tourapis | H04N 19/147 375/E7.121 |
| 2005/0052294 A1 | 3/2005 | Liang et al. | |
| 2006/0222074 A1 | 10/2006 | Zhang | |
| 2007/0098067 A1* | 5/2007 | Kim | H04N 19/176 375/240.08 |
| 2008/0107180 A1 | 5/2008 | Lee et al. | |
| 2008/0159641 A1 | 7/2008 | Moriya et al. | |
| 2009/0003441 A1 | 1/2009 | Sekiguchi et al. | |
| 2010/0080285 A1 | 4/2010 | Lee et al. | |
| 2011/0013697 A1 | 1/2011 | Choi et al. | |
| 2011/0170601 A1 | 7/2011 | Kim et al. | |
| 2011/0176612 A1 | 7/2011 | Tsai et al. | |
| 2011/0194609 A1* | 8/2011 | Rusert | H04N 19/105 375/240.16 |
| 2011/0211642 A1 | 9/2011 | Cho et al. | |
| 2011/0228858 A1* | 9/2011 | Budagavi | H04N 19/70 375/240.25 |
| 2011/0293001 A1 | 12/2011 | Lim et al. | |
| 2012/0008688 A1 | 1/2012 | Tsai et al. | |
| 2012/0106622 A1 | 5/2012 | Huang et al. | |
| 2012/0128073 A1 | 5/2012 | Asaka et al. | |
| 2012/0163466 A1 | 6/2012 | Sugio et al. | |
| 2012/0195368 A1 | 8/2012 | Chien et al. | |
| 2012/0195379 A1 | 8/2012 | Alshin et al. | |
| 2012/0236934 A1 | 9/2012 | Chen et al. | |
| 2012/0236941 A1* | 9/2012 | Lin | H04N 19/513 375/240.16 |
| 2012/0236942 A1* | 9/2012 | Lin | H04N 19/52 375/240.16 |
| 2012/0257678 A1 | 10/2012 | Zhou et al. | |
| 2012/0269270 A1 | 10/2012 | Chen et al. | |
| 2012/0269271 A1 | 10/2012 | Chen et al. | |
| 2012/0287999 A1* | 11/2012 | Li | H04N 19/52 375/240.16 |
| 2012/0320969 A1 | 12/2012 | Zheng et al. | |
| 2013/0003847 A1 | 1/2013 | Hong et al. | |
| 2013/0003851 A1 | 1/2013 | Yu et al. | |
| 2013/0016788 A1 | 1/2013 | Oh | |
| 2013/0022119 A1 | 1/2013 | Chien et al. | |
| 2013/0022122 A1 | 1/2013 | Oh et al. | |
| 2013/0022125 A1 | 1/2013 | Sato | |
| 2013/0070854 A1 | 3/2013 | Wang et al. | |
| 2013/0077691 A1* | 3/2013 | Zheng | H04N 19/105 375/240.16 |
| 2013/0083853 A1* | 4/2013 | Coban | H04N 19/563 375/240.16 |
| 2013/0107951 A1* | 5/2013 | Sole Rojals | H04N 19/13 375/240.12 |
| 2013/0114735 A1* | 5/2013 | Wang | H04N 19/176 375/240.23 |
| 2013/0177084 A1 | 7/2013 | Wang et al. | |
| 2013/0188716 A1* | 7/2013 | Seregin | H04N 19/56 375/240.16 |
| 2013/0195189 A1 | 8/2013 | Seregin et al. | |
| 2013/0243081 A1 | 9/2013 | Chen et al. | |
| 2013/0287108 A1 | 10/2013 | Chen et al. | |
| 2013/0336405 A1 | 12/2013 | Chen et al. | |
| 2014/0016701 A1 | 1/2014 | Chen et al. | |
| 2014/0044180 A1 | 2/2014 | Chen et al. | |
| 2014/0086325 A1* | 3/2014 | Chen | H04N 19/52 375/240.14 |
| 2014/0086328 A1 | 3/2014 | Chen et al. | |
| 2014/0086329 A1 | 3/2014 | Seregin et al. | |
| 2014/0092981 A1 | 4/2014 | Lin et al. | |
| 2014/0098882 A1 | 4/2014 | Zhang et al. | |
| 2014/0105296 A1 | 4/2014 | Alshina et al. | |
| 2014/0126641 A1 | 5/2014 | Takahashi et al. | |
| 2014/0133567 A1 | 5/2014 | Rusanovskyy et al. | |
| 2014/0153647 A1 | 6/2014 | Nakamura et al. | |
| 2014/0161175 A1 | 6/2014 | Zhang et al. | |
| 2014/0169474 A1 | 6/2014 | Kang et al. | |
| 2014/0247878 A1 | 9/2014 | Xu et al. | |
| 2014/0301461 A1 | 10/2014 | Jeon et al. | |
| 2014/0301463 A1 | 10/2014 | Rusanovskyy et al. | |
| 2014/0301471 A1 | 10/2014 | Lin | |
| 2015/0085930 A1* | 3/2015 | Zhang | H04N 19/136 375/240.15 |
| 2015/0172716 A1* | 6/2015 | Chen | H04N 19/105 375/240.02 |
| 2015/0319441 A1* | 11/2015 | Puri | H04N 19/61 375/240.02 |
| 2016/0165263 A1* | 6/2016 | Zhang | H04N 19/597 375/240.12 |

FOREIGN PATENT DOCUMENTS

| | | |
|---|---|---|
| CN | 1965321 A | 5/2007 |
| CN | 101072356 A | 11/2007 |
| CN | 101573985 A | 11/2009 |
| CN | 102215392 A | 10/2011 |
| CN | 102685477 A | 9/2012 |
| CN | 102883163 A | 1/2013 |
| EP | 1513349 A2 | 3/2005 |
| KR | 20120016991 A | 2/2012 |
| KR | 20120066593 A | 6/2012 |
| RU | 2010102711 A | 8/2011 |
| WO | 2010056013 A2 | 5/2010 |
| WO | 2012034690 A1 | 3/2012 |
| WO | 2012071871 A1 | 6/2012 |
| WO | 2012122786 A1 | 9/2012 |
| WO | 2012177664 A1 | 12/2012 |
| WO | 2013067938 A1 | 5/2013 |

OTHER PUBLICATIONS

HM7: High Efficiency Video Coding (HEVC) Test Model 7 Encoder Description. 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG. 16), No. JCTVC-I1002, Jul. 9, 2012, XP030112372, 50 pages.

"Minhua Zhou, Parallelized merge/skip mode for HEVC. Joint Collaborative Team on Video Coding (JCT-VC) of ITU-T SG16 WP3 and ISO/IEC JTC1/SC29/WG11 6th Meeting: Torino, IT, Jul. 14-22, 2011, JCTVC-F069, 13 pages".

"Xing Wen et al, Parallel Merge/skip Mode for HEVC. Joint Collaborative Team on Video Coding (JCT-VC) of ITU-T SG16 WP3 and ISO/IEC JTC1/SC29/WG11 7th Meeting: Geneva, CH, Nov. 21-30, 2011, JCTVC-G387, 13 pages".

Hui Yong Kim et al, CU-based Merge Candidate List Construction. Joint Collaborative Team on Video Coding (JCT-VC) of ITU-T SG16 WP3 and ISO/IEC JTC1/SC29/WG11 7th Meeting: Geneva, Nov. 21-30, 2011, JCTVC-G416, 15 pages.

(56) References Cited

OTHER PUBLICATIONS

"Yunfei Zheng et al, Non-CE9: Simplified Merge candidate derivation. Joint Collaborative Team on Video Coding (JCT-VC) of ITU-T SG16 WP3 and ISO/IEC JTC1/SC29/WG11 7th Meeting: Geneva, CH, Nov. 21-30, 2011, JCTVC-G681, 5 pages".

"Yongjoon Jeon et al, Parallel Merge Candidate Derivation for Inter_NxN partition type. Joint Collaborative Team on Video Coding (JCT-VC) of ITU-T SG16 WP3 and ISO/IEC JTC1/SC29/WG11 8th Meeting: San José, CA, USA, Feb. 1-10, 2012, JCTVC-H0091, 4 pages".

Jian-Liang Lin et al, Parallel NxN merge mode. Joint Collaborative Team on Video Coding (JCT-VC) of ITU-T SG 16 WP 3 and ISO/IEC JTC 1/SC 29/WG 11 9th Meeting: Geneva, CH, Apr. 27-May 7, 2012, JCTVC-I0180, 4 pages.

"Yongbing Lin et al, Removal of dependency between multiple PUs in a CU for parallel merging candidate list construction. Joint Collaborative Team on Video Coding (JCT-VC) of ITU-T SG 16 WP 3 and ISO/IEC JTC 1/SC 29/WG 11 11th Meeting: Shanghai, CN, Oct. 10-19, 2012, JCTVC-K0197, 5 pages".

Jiann-Jone Chen et al, A Multiple Description Video Codec With Adaptive Residual Distributed Coding. IEEE Transactions on Circuits and Systems for Video Technology ( vol. 22, Issue: 5, May 2012 ), Dec. 12, 2011, 15 pages.

"Minhua Zhou, Scalable motion vector competition and simplified MVP calculation . Joint Collaborative Team on Video Coding (JCT-VC) of ITU-T SG16 WP3 and ISO/IEC JTC1/SC29/WG11 4th Meeting: Daegu, KR, Jan. 20-28, 2011, JCTVC-D055, m18802, 9 pages".

Michael Tok et al, Parametric Motion Vector Prediction for Hybrid Video Coding. 2012 Picture Coding Symposium, May 7-9, 2012, Kraków, Poland, 4 pages.

Bici O et al: "Non-CE13: Simplification of merge mode", 7. JCT-VC Meeting; 98. MPEG Meeting; Nov. 21, 2011-Nov. 30, 2011, Geneva; (Joint Collaborative Team on Video Coding of ISO/IEC JTC1/SC29/WG11 and ITU-T SG.16), No. JCTVC-G593, Nov. 8, 2011, XP030110577, 12 pages.

"Philipp Helle et al: ""Block Merging for Quadtree-Based Partitioning in HEVC"", IEEE Transactions on Circuits and Systems for Video Technology, IEEE Service Center, Piscataway, NJ, US, vol. 22, No. 12, Dec. 1, 2012, pp. 1720-1731, XP011487155, 12 pages".

Gary J Sullivan et al: "Overview of the High Efficiency Video Coding (HEVC) Standard", IEEE Transactions on Circuits and Systems for Video Technology, IEEE Service Center, Piscataway, NJ, US, vol. 22, No. 12, Dec. 1, 2012, pp. 1649-1668, XP011487803. 20 pages.

Oguz Bid et al: "Non-CE13: Simplification of merge mode", Joint Collaborative Team on Video Coding (JCT-VC) of ITU-T SG16 WP3 and ISO/IEC JTC1/SC29/WG11, Nov. 25, 2011, XP055372709, 14 pages.

Bici O et al: "CE9: Results of SP experiments on simplification of merge process", 8. JCT-VC Meeting; 99. MPEG Meeting; Feb. 2, 2012-Feb. 10, 2012; San Jose; (Joint Collaborative Team on Video Coding of ISO/IEC JTC1/SC29/WG11 and ITU-T SG.16), No. JCTVC-H0252, Jan. 20, 2012, XP030111279, 8 pages.

"McCann K et al: ""High Efficiency Video Coding (HEVC) Test Model 5 (HM 5) Encoder Description"", 7. JCT-VC Meeting; Nov. 21, 2011-Nov. 30, 2011;Geneva; (Joint Collaborative Team on Video Coding of ISO/IEC JTC1/SC29/WG11 and ITU-T SG.16), No. JCTVC-G1102, Jan. 30, 2012, XP030111031, 46 pages".

Kim,Il-Koo,et al, HM7: High Efficiency Video Coding (HEVC) Test Model 7 Encoder Description[online], Joint Collaborative Team on Video Coding(JCT-VC) of ITU-T SG16 WP3 and ISO/IEC JTC1/SC29/WG11 JCTVC-I1002, Jul. 28, 2012, 7 pages.

"Bross, B., et al, High efficiency video coding(HEVC) text specification draft 8, Joint Collaborative Team on Video Coding(JCT-VC) of ITU-T SG16 WP3 and ISO/IEC JTC1/SC29/WG11 JCTVC-J1003_d7, Jul. 28, 2012, 9 pages".

\* cited by examiner

METHOD AND APPARATUS FOR BUILDING MOTION VECTOR LIST FOR MOTION VECTOR PREDICTION

CROSS-REFERENCE TO RELATED APPLICATION

This application is a continuation of U.S. patent application Ser. No. 15/345,948, filed on Nov. 8, 2016, now U.S. Pat. No. 10,045,044. which is a continuation of U.S. patent application Ser. No. 14/311,012, filed on Jun. 20, 2014, now U.S. Pat. No. 9,549,181. which is a continuation of International Application No. PCT/CN2013/073817, filed on Apr. 7, 2013, which claims priority to Chinese Patent Application No. 201210377579.4, filed on Oct. 8, 2012, All of the aforementioned applications are hereby incorporated by reference in their entireties.

TECHNICAL FIELD

The present invention relates to the field of video coding, and in particular, to a method and an apparatus for building a motion vector list for motion vector prediction.

BACKGROUND

An interframe prediction technology in the High Efficiency Video Coding (HEVC) adopts a conventional Motion Compensated Prediction (MCP) method. For motion vector prediction, the HEVC adopts a multiple motion vectors competition method, which improves the accuracy of motion vector prediction, thereby improving the coding compression performance.

The HEVC interframe prediction mode may include, but is not limited to, a Merge mode, a Skip mode, and so on, all of which use the multiple motion vectors competition to perform interframe prediction. A motion vector list is used when motion vector prediction is performed. For the Merge mode and the Skip mode, the motion vector list is allowed to contain at most four spatial motion vector predictors and one temporal motion vector predictor, where the Merge mode and the Skip mode share one motion vector list. A coder selects a best motion vector predictor from the motion vector list as a motion vector predictor of a current Prediction Unit (PU), which may be called a prediction block hereinafter.

Figure 1:
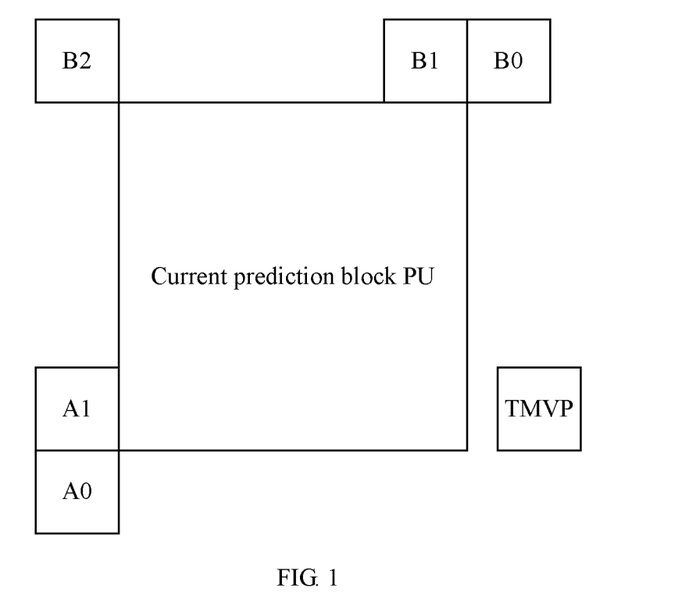
FIG. 1 is a schematic structural diagram of a coding unit CU, a PU, and neighboring blocks according to an embodiment.

A method for building the motion vector list may include:

As shown in FIG. 1, spatial neighboring blocks of the current PU may include: a neighboring block A0 (a bottom-left reference block corresponding to a bottom-left corner position of the current PU), a neighboring block A1 (a left reference block corresponding to the bottom-left corner position of the current PU), a neighboring block B0 (a top-right reference block corresponding to a top-right corner position of the current PU), a neighboring block B1 (a top reference block corresponding to the top-right corner position of the current PU), and a neighboring block B2 (a top-left reference block corresponding to a top-left position of the current PU). A Temporal Motion Vector predictor (TMVP) is a motion vector corresponding to the current PU in time domain.

Firstly, motion vectors are successively obtained from the neighboring blocks and the TMVP in a sequence of the neighboring block A1, the neighboring block B1, the neighboring block B0, the neighboring block A0, the neighboring block B2, and the TMVP. Then, the obtained motion vectors as motion vector predictors are added to the motion vector list according to a rule in the HEVC. The specific motion vector list building process is a technology well known by a person skilled in the art, so that details will not be described herein again.

Further, a current Coding Unit (CU), which may be called a coding unit hereinafter, may include at least two PUs, and motion vector lists of the at least two PUs are built in a serial manner.

During the implementation of the above motion vector list building process, it is found that the prior art has at least the following problem: if the current CU includes at least two PUs, and the motion vector lists of the at least two PUs are built in a serial manner, the speed of building the motion vector lists of the at least two PUs in the same CU is slow, thereby reducing the parallel processing capability.

SUMMARY

Embodiments of the present invention provide a method and an apparatus for building a motion vector list for motion vector prediction, which solve the problem of building motion vector lists of at least two PUs in a same coding unit in a serial manner, and improve the parallel processing capability.

In order to achieve the above objective, the following technical solutions are adopted in the embodiments of the present invention.

In one aspect, a method for building a motion vector list for motion vector prediction is provided, which includes: obtaining spatial neighboring blocks of a current prediction block, where the current prediction block is located inside a current coding unit; determining available neighboring blocks of the current prediction block according to a partition manner of the current coding unit, where the available neighboring blocks are located outside the current coding unit; and obtaining motion vectors as motion vector predictors from the available neighboring blocks in a preset sequence according to motion vectors of the available neighboring blocks, and adding the obtained motion vectors to the motion vector list.

In another aspect, an apparatus for building a motion vector list for motion vector prediction is provided, which includes: a receiver configured to obtain spatial neighboring blocks of a current prediction block, where the current prediction block is located inside a current coding unit; and a processor configured to determine available neighboring blocks of the current prediction block according to a partition manner of the current coding unit, where the available neighboring blocks are located outside the current coding unit; and obtain motion vectors from the available neighboring blocks in a preset sequence according to motion vectors of the available neighboring blocks, and add the obtained motion vectors to the motion vector list.

In the method and apparatus for building a motion vector list for motion vector prediction provided in the embodiments of the present invention, through the above solutions, when a motion vector list of a prediction block is built, spatial neighboring blocks of the current prediction block are obtained firstly, where the current prediction block is located inside a current coding unit; available neighboring blocks of the current prediction block are determined according to a partition manner of the current coding unit, where the available neighboring blocks are located outside the current coding unit; and motion vectors as motion vector predictors are obtained from the available neighboring blocks in a preset sequence according to motion vectors of the available neighboring blocks, and the obtained motion vectors are added to the motion vector list. In this way, when the motion vector list of the prediction block is built, no neighboring block located inside the current coding unit is considered. When the coding unit includes at least two prediction blocks, motion vector lists of the at least two prediction blocks may be built in a parallel manner, which increases the speed of building the motion vector lists of the at least two prediction blocks in the same coding unit, and improves the parallel processing capability.

BRIEF DESCRIPTION OF DRAWINGS

To illustrate the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

In the prior art, a CU may include at least two PUs, and motion vector lists of the at least two PUs are built in a serial manner. That is, after the motion vector list is built for a current PU, a motion vector list starts to be built for the next PU.

The specific process may include:

As shown in FIG. 2A to FIG. 2G a CU (solid line frame in figures) may be further partitioned into multiple PUs. In the HEVC, the CU may have seven partition manners. For example, in the partition manners shown in FIG. 2A to FIG. 2C, a current CU is partitioned into two PUs (PU1 and PU2) on left and right sides. For another example, in the partition manner shown in FIG. 2D, the current CU is partitioned into four PUs (PU1, PU2, PU3, and PU4), and other types are not described herein.

Figure 2A:
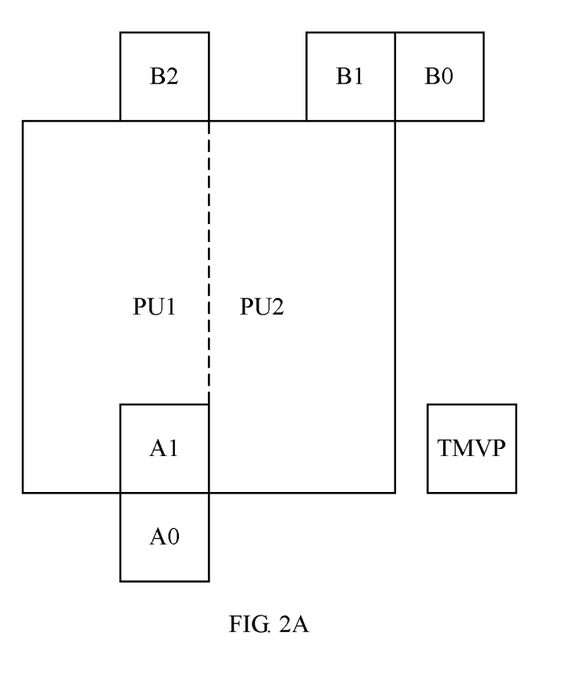
FIG. 2A to FIG. 2G are schematic structural diagrams of a coding unit CU with different partition manners according to an embodiment.

Taking the partition shown in FIG. 2A as an example, since a spatial reference block A1 of the PU2 is located inside the PU1, a motion vector list of the PU2 can start to be built only after PU1 coding is finished, where the motion vector lists of the PU1 and the PU2 are built in a serial manner. Specifically, the motion vector list of the PU1 is firstly built according to the above method, and then the motion vector list of the PU2 is built according to the above method.

In this way, the speed of building the motion vector lists of at least two PUs is slow, and the compression coding performance is degraded.

Figure 3:
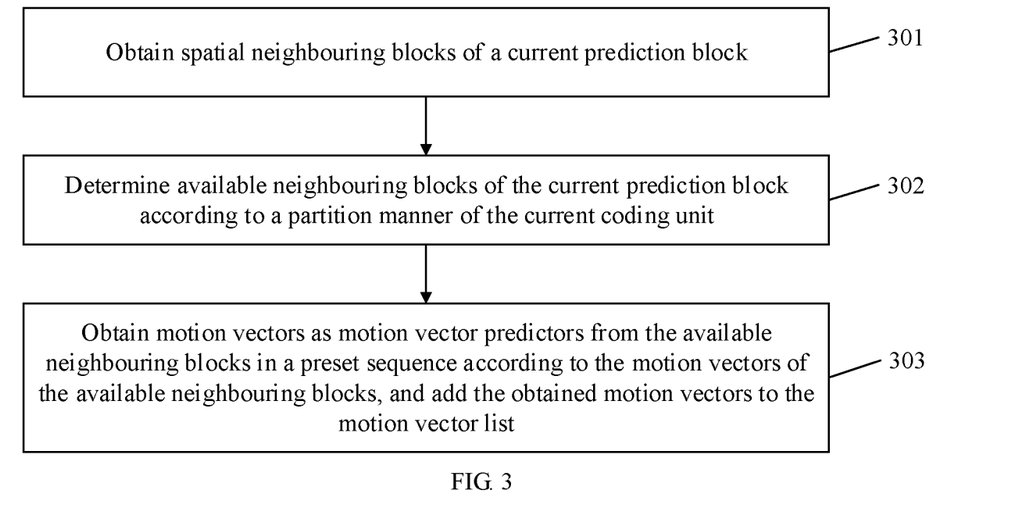
FIG. 3 is a flowchart of a method for building a motion vector list for motion vector prediction according to an embodiment.

In order to solve the above problem that the speed of building the motion vector lists of at least two PUs is slow and the compression coding performance is degraded, a method for building a motion vector list for motion vector prediction is provided in an embodiment. As shown in FIG. 3, the method may include:

301: Obtain spatial neighboring blocks of a current prediction block, where the current prediction block is located inside a current coding unit.

302: Determine available neighboring blocks of the current prediction block according to a partition manner of the current coding unit, where the available neighboring blocks are located outside the current coding unit.

303: Obtain motion vectors from the available neighboring blocks in a preset sequence according to motion vectors of the available neighboring blocks, and add the obtained motion vectors to the motion vector list.

Through the above solution, when building a motion vector list of a prediction block, spatial neighboring blocks of the current prediction block are obtained firstly, where the current prediction block is located inside a current coding unit; available neighboring blocks of the current prediction block are determined according to a partition manner of the current coding unit, where the available neighboring blocks are located outside the current coding unit; and motion vectors are obtained from the available neighboring blocks in a preset sequence according to motion vectors of the available neighboring blocks, and the obtained motion vectors are added to the motion vector list. In this way, when the motion vector list of the prediction block is built, no neighboring block located inside the current coding unit is considered. When the coding unit includes at least two prediction blocks, motion vector lists of the at least two prediction blocks may be built in a parallel manner, which increases the speed of building the motion vector lists of the at least two prediction blocks in the same coding unit, and improves the parallel processing capability.

Another method for building a motion vector list for motion vector prediction is provided in an embodiment, and the method is further an extension of the method shown in FIG. 3. As shown in FIG. 3, the method may include:

301: Obtain spatial neighboring blocks of a current prediction block, where the current prediction block is located inside a current coding unit.

As shown in FIG. 1, the spatial neighboring blocks of the prediction block may include: a neighboring block A0 located at a bottom-left side of the prediction block, a neighboring block A1 located at a left side of the prediction block, a neighboring block B0 at a top-right side of the prediction block, a neighboring block B1 at a top side of the prediction block, and a neighboring block B2 at a top-left side of the prediction block.

A method for obtaining the spatial neighboring blocks of the prediction block, the prediction block, and the neighboring blocks is not limited in this embodiment, and is a technology well known by a person skilled in the art, so that details will not be described herein again.

302: Determine available neighboring blocks of the current prediction block according to a partition manner of the current coding unit, where the available neighboring blocks are located outside the current coding unit.

Figure 2B:
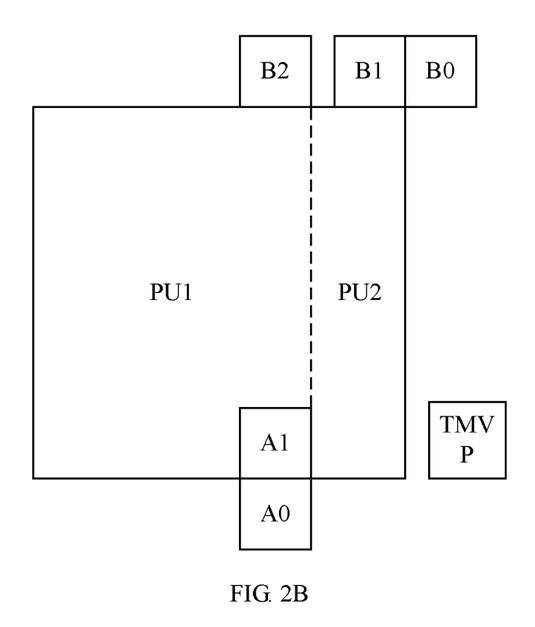
Figure 2C:
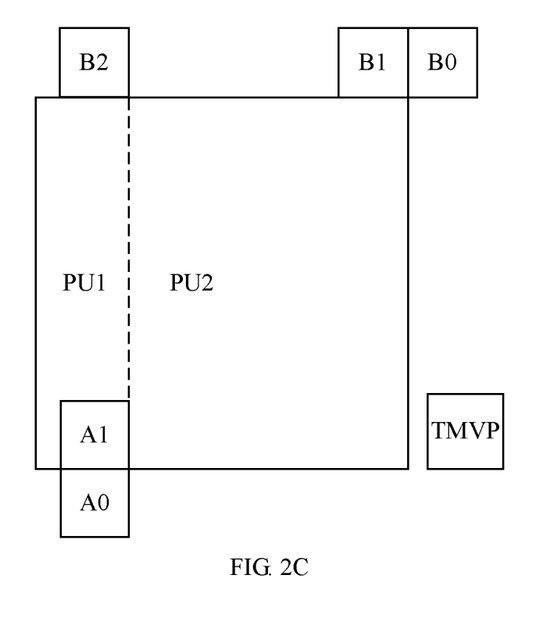
Figure 2D:
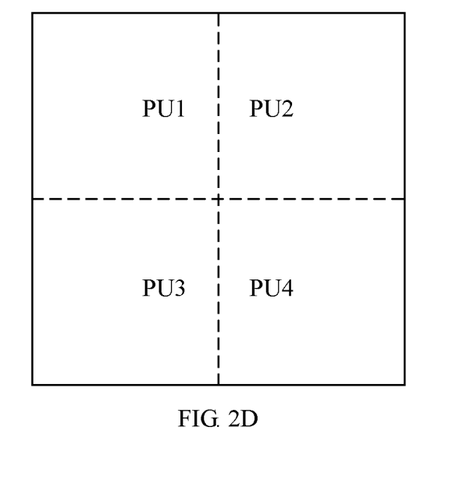
Figure 2E:
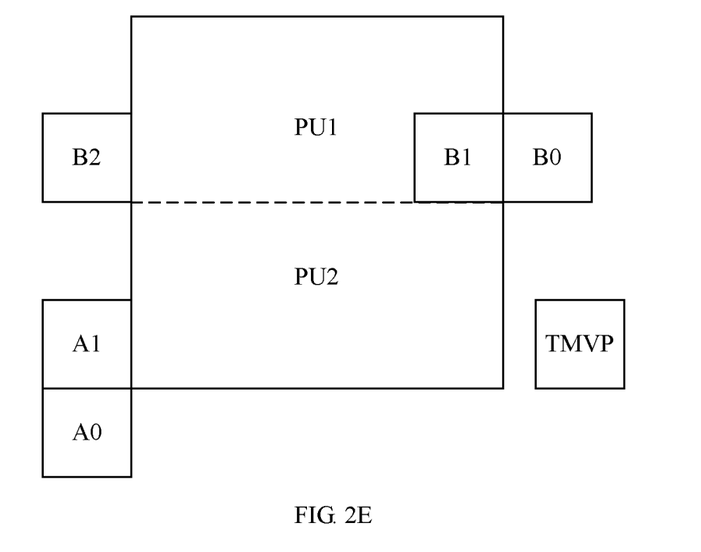
Figure 2F:
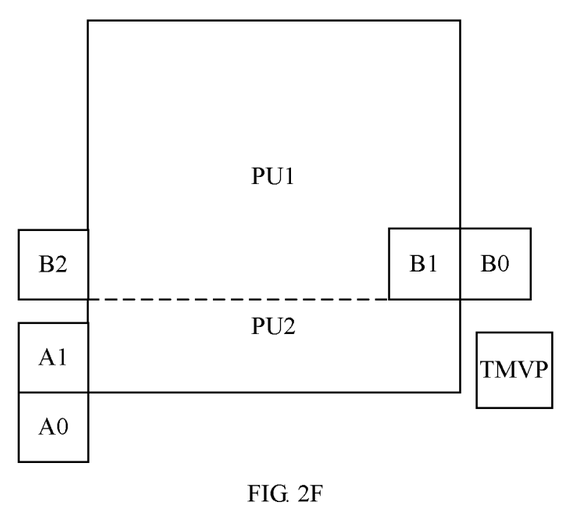
Figure 2G:
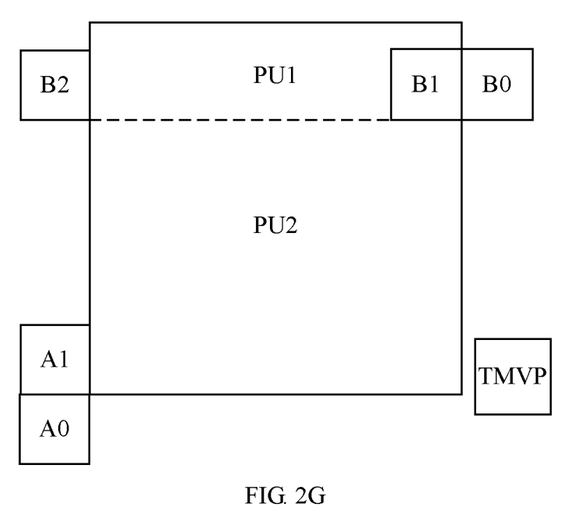

Further, as shown in FIG. 2E to FIG. 2G if the current coding unit CU is partitioned into a first prediction block PU1 and a second prediction block PU2 on top and bottom sides, and the current prediction block is the second prediction block PU2, the available neighboring blocks of the PU2 include: the neighboring block A0, the neighboring block A1, the neighboring block B0, and the neighboring block B2 of the second prediction block. At this time, the neighboring block B1 is located inside the current coding unit CU, and does not act as the available neighboring block of the second prediction block PU2.

As shown in FIG. 2A to FIG. 2C, if the current coding unit CU is partitioned into a first prediction block PU1 and a second prediction block PU2 on left and right sides, and the current prediction block is the second prediction block PU2, the available neighboring blocks of the PU2 include: neighboring block A0, neighboring block B0, neighboring block B1, and neighboring block B2 of the second prediction block PU2. At this time, the neighboring block A1 is located inside the current coding unit CU, and does not act as the available neighboring block of the second prediction block PU2.

Further, the available neighboring blocks may be determined by using flag bits of the neighboring blocks. The flag bits may, but are not limited to, be used to identify that the neighboring blocks are not located inside the CU.

A method for determining the available neighboring blocks by using the flag bit(s) of the neighboring blocks is not limited in this embodiment, and is a technology well known by a person skilled in the art, so that details will not be described herein again.

303: Obtain motion vectors from the available neighboring blocks in a preset sequence according to motion vectors of the available neighboring blocks, and add the obtained motion vectors to the motion vector list.

Further, the obtaining motion vectors from the available neighboring blocks in a preset sequence may include, if the available neighboring blocks are interframe coding blocks, obtaining the motion vectors from the available neighboring blocks in a sequence of the neighboring block A1, the neighboring block B1, the neighboring block B0, the neighboring block A0, and the neighboring block B2.

Specifically, if the available neighboring blocks are interframe coding blocks, it indicates that the neighboring blocks include motion vector information, and the motion vectors are obtained from the neighboring blocks.

Specifically, if the available neighboring blocks of the prediction block include the neighboring block A0, the neighboring block A1, the neighboring block B0, and the neighboring block B2 of the second prediction block, the motion vectors are obtained from the neighboring block A0, the neighboring block A1, the neighboring block B0, and the neighboring block B2 in a sequence of the neighboring block A0, the neighboring block A1, the neighboring block B0, and the neighboring block B2. In view of the above, when the current CU is partitioned into the first and the second prediction blocks on top and bottom sides, the available neighboring blocks of the second prediction block do not include the neighboring block B1 located inside the first prediction block. Therefore, the motion vector from B1 is not obtained.

If the available neighboring blocks of the prediction block include: the neighboring block A0, the neighboring block B0, the neighboring block B1, and the neighboring block B2 of the second prediction block PU2, the motion vectors are obtained from the neighboring block A0, the neighboring block B0, the neighboring block B1, and the neighboring block B2 in a sequence of the neighboring block A0, the neighboring block B0, the neighboring block B1, and the neighboring block B2. In view of the above, when the current CU is partitioned into the first and the second prediction blocks on left and right sides, the available neighboring blocks of the second prediction block do not include the neighboring block A1 located inside the first prediction block. Therefore, the motion vector from the A1 is not obtained.

Further, if the obtained motion vector is a motion vector of a current available neighboring block, the adding the obtained motion vectors to the motion vector list includes determining whether the motion vector of the current available neighboring block is the same as motion vectors of other available neighboring blocks except the current available neighboring block; and if not, adding the motion vector of the current available neighboring block to the motion vector list.

In view of the above, during the above process, since the available neighboring blocks do not include the neighboring block located inside the current CU, multiple PUs of the CU have no dependency, and may be executed in parallel. For example, when the current CU is partitioned into the first and the second prediction blocks on left and right sides, the available neighboring blocks of the second prediction block do not include the neighboring block A1 located inside the first prediction block, and the motion vector of the A1 is not involved in the determination process. Therefore, the second prediction block and the first prediction block may execute the process in parallel.

Specifically, as an implementation manner of the embodiment, if the current available neighboring block is the neighboring block B1, it is determined whether a motion vector of the neighboring block B1 is the same as a motion vector of the neighboring block A1; if the current available neighboring block is the neighboring block B0, it is determined whether a motion vector of the neighboring block B0 is the same as the motion vector of the neighboring block B1; if the current available neighboring block is the neighboring block A0, it is determined whether a motion vector of the neighboring block A0 is the same as the motion vector of the neighboring block A1; and if the current available neighboring block is the neighboring block B2, it is determined whether a motion vector of the neighboring block B2 is the same as at least one of the motion vector of the neighboring block A1 and the motion vector of the neighboring block B1.

Further, if the obtained motion vector is a motion vector of a current available neighboring block, the adding the obtained motion vectors to the motion vector list may further include determining whether the motion vector of the current available neighboring block is the same as motion vectors that have been added to the motion vector list; and if not, adding the motion vector of the current available neighboring block to the motion vector list.

Specifically, as an implementation manner of the embodiment, if the current available neighboring block is the neighboring block B1, it is determined whether the motion vector of the neighboring block B1 is the same as the motion vector, of the neighboring block A1 that has been added to the motion vector list; if the current available neighboring block is the neighboring block B0, it is determined whether the motion vector of the neighboring block B0 is the same as the motion vector, of the neighboring block B1 that has been added to the motion vector list; if the current available neighboring block is the neighboring block A0, it is determined whether the motion vector of the neighboring block A0 is the same as the motion vector, of the neighboring block A1 that has been added to the motion vector list; and if the current available neighboring block is the neighboring block B2, it is determined whether the motion vector of the neighboring block B2 is the same as at least one of the motion vector, of the neighboring block A1 that has been added to the motion vector list and the motion vector, of the neighboring block B1 that has been added to the motion vector list.

Further, a TMVP may further be considered during the build-up of the motion vector list.

As an implementation manner of the embodiment, the obtaining motion vectors from the available neighboring blocks in a preset sequence may further be obtaining motion vectors from the available neighboring blocks and/or the TMVP in a sequence of the neighboring block A1, the neighboring block B1, the neighboring block B0, the neighboring block A0, the neighboring block B2, and the TMVP.

In order to describe the solution of the present invention more clearly, the method for building the motion vector list for the CU with different partition manners are specifically described below.

1. The CU is Partitioned into a PU1 and a PU2 on Left and Right Sides (1) Build a Motion Vector List of the PU1

1) Obtain motion vectors from the neighboring block A1, the neighboring block B1, the neighboring block B0, the neighboring block A0, and the neighboring block B2 in a sequence of the neighboring block A1, the neighboring block B1, the neighboring block B0, the neighboring block A0, and the neighboring block B2, and add them to the motion vector list.

a. When the current neighboring block is the neighboring block A1, and only when the neighboring block A1 includes a motion vector, add the motion vector of the neighboring block A1 to the motion vector list; b. when the current neighboring block is the neighboring block B1, and only when the neighboring block B1 includes a motion vector, and the motion vector of the neighboring block B1 is different from the motion vector of the neighboring block A1 that has been added to the motion vector list, add the motion vector of the neighboring block B1 to the motion vector list; c. when the current neighboring block is the neighboring block B0, and only when the neighboring block B0 includes a motion vector, and the motion vector of the neighboring block B0 is different from the motion vector of the neighboring block B1 that has been added to the motion vector list, add the motion vector of the neighboring block B0 to the motion vector list; d. when the current neighboring block is the neighboring block A0, and only when the neighboring block A0 includes a motion vector, and the motion vector of the neighboring block A0 is different from the motion vector of the neighboring block A1 that has been added to the motion vector list, add the motion vector of the neighboring block A0 to the motion vector list; and e. when the current neighboring block is the neighboring block B2, and only when the neighboring block B2 includes a motion vector, the motion vector of the neighboring block B2 is different from both the motion vector of the neighboring block A1 that has been added to the motion vector list, and the motion vector of the neighboring block B1 that has been added to the motion vector list, and the motion vector of at least one of the neighboring block A1, the neighboring block B1, the neighboring block B0, and the neighboring block A0 has not been added to the motion vector list, add the motion vector of the neighboring block B2 to the motion vector list.

2) Obtain the TMVP, and add it to the motion vector list. Specifically, the TMVP of the PU1 is obtained by using a temporal reference image of the PU1, and if the TMVP of the PU1 is available, the TMVP is added to the motion vector list.

(2) Build a motion vector list of the PU2

1) Obtain motion vectors from the neighboring block B1, the neighboring block B0, the neighboring block A0, and the neighboring block B2 in a sequence of the neighboring block B1, the neighboring block B0, the neighboring block A0, and the neighboring block B2, and add them to the motion vector list.

a. When the current neighboring block is the neighboring block B1, and only when the neighboring block B1 includes a motion vector, add the motion vector of the neighboring block B1 to the motion vector list; b. when the current neighboring block is the neighboring block B0, and only when the neighboring block B0 includes a motion vector, and the prediction value is different from the motion vector, of the neighboring block B1 that has been added to the motion vector list, add the motion vector of the neighboring block B0 to the motion vector list; c. when the current neighboring block is the neighboring block A0, and only when the neighboring block A0 includes a motion vector, add the motion vector of the neighboring block A0 to the motion vector list; and d. when the current neighboring block is the neighboring block B2, and only when the neighboring block B2 includes a motion vector, and the motion vector of the neighboring block B2 is different from the motion vector of the neighboring block B1 that has been added to the motion vector list, add the motion vector of the neighboring block B2 to the motion vector list.

2) Obtain the TMVP, and add it to the motion vector list. Specifically, the TMVP of the PU1 is obtained by using a temporal reference image of the PU1, and if the TMVP of the PU1 is available, the TMVP is added to the motion vector list.

At this time, since when the motion vector list of the PU2 is built, the neighboring block A1 of the PU2 is not considered, the motion vector lists of the PU1 and the PU2 may be built in a parallel manner.

2. The CU is Partitioned into a PU1 and a PU2 on Top and Bottom Sides (1) Build a Motion Vector List of the PU1

This is similar to the method of "(1) Build a motion vector list of the PU1" in "1. The CU is partitioned into a PU1 and a PU2 on left and right sides", so the details will not be described herein again.

(2) Build a Motion Vector List of the PU2

1) Obtain motion vectors from the neighboring block B1, the neighboring block B0, the neighboring block A0, and the neighboring block B2 in a sequence of the neighboring block B1, the neighboring block B0, the neighboring block A0, and the neighboring block B2, and add them to the motion vector list.

a. When the current neighboring block is the neighboring block A1, and only when the neighboring block A1 includes a motion vector, add the motion vector of the neighboring block A1 to the motion vector list; b. when the current neighboring block is the neighboring block B0, and only when the neighboring block B0 includes a motion vector, add the motion vector of the neighboring block B0 to the motion vector list; c. when the current neighboring block is the neighboring block A0, and only when the neighboring block A0 includes a motion vector, and the motion vector of the neighboring block A0 is different from the motion vector of the neighboring block A1 that has been added to the motion vector list, add the motion vector of the neighboring block A0 to the motion vector list; and d. when the current neighboring block is the neighboring block B2, and only when the neighboring block B2 includes a motion vector, and the motion vector of the neighboring block B2 is different from the motion vector of the neighboring block A1 that has been added to the motion vector list, add the motion vector of the neighboring block B2 to the motion vector list.

2) Obtain the TMVP, and add it to the motion vector list. Specifically, the TMVP of the PU1 is obtained by using a temporal reference image of the PU1, and if the TMVP of the PU1 is available, the TMVP is added to the motion vector list.

At this time, since when the motion vector list of the PU2 is built, the neighboring block B1 of the PU2 is not considered, the motion vector lists of the PU1 and the PU2 may be built in a parallel manner.

Through the above solution, when a motion vector list of a prediction block is built, spatial neighboring blocks of the current prediction block are obtained firstly, where the current prediction block is located inside a current coding unit; available neighboring blocks of the current prediction block are determined according to a partition manner of the current coding unit, where the available neighboring blocks are located outside the current coding unit; and motion vectors as motion vector predictors are obtained from the available neighboring blocks in a preset sequence according to motion vectors of the available neighboring blocks, and the obtained motion vectors as motion vector predictors are added to the motion vector list. In this way, when the motion vector list of the prediction block is built, no neighboring block located inside the current coding unit is considered. When the coding unit includes at least two prediction blocks, motion vector lists of the at least two prediction blocks may be built in a parallel manner, which increases the speed of building the motion vector lists of the at least two prediction blocks in the same coding unit, and improves the parallel processing capability.

Some apparatus embodiments are provided below, and the provided apparatus embodiments respectively correspond to the above method embodiments. Refer to the method embodiments for specific implementation manners of the apparatus and a receiver and a processor included in the apparatus.

Figure 4:
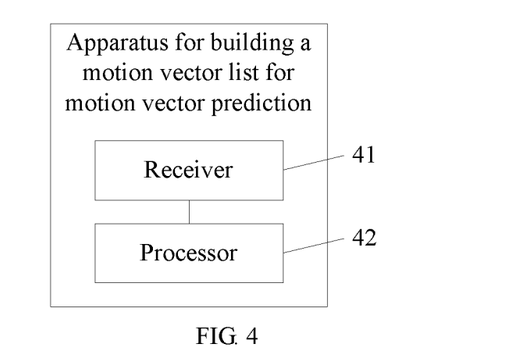
FIG. 4 is a schematic structural diagram of an apparatus for building a motion vector list for motion vector prediction according to an embodiment.

An apparatus for building a motion vector list for motion vector prediction is provided in an embodiment. As shown in FIG. 4, the apparatus may include: a receiver 41 configured to obtain spatial neighboring blocks of a current prediction block, where the current prediction block is located inside a current coding unit; and a processor 42 configured to determine available neighboring blocks of the current prediction block according to a partition manner of the current coding unit, where the available neighboring blocks are located outside the current coding unit; and obtain motion vectors as motion vector predictors from the available neighboring blocks in a preset sequence according to motion vectors of the available neighboring blocks, and add the obtained motion vectors to the motion vector list.

Further, the spatial neighboring blocks of the prediction block obtained by the receiver 41 include a neighboring block A0 located at a bottom-left side of the prediction block, a neighboring block A1 located at a left side of the prediction block, a neighboring block B0 at a top-right side of the prediction block, a neighboring block B1 at a top side of the prediction block, and a neighboring block B2 at a top-left side of the prediction block.

Further, the processor 42 is further configured to, if the current coding unit is partitioned into a first prediction block and a second prediction block on top and bottom sides, and the current prediction block is the second prediction block, the available neighboring blocks of the prediction block include the neighboring block A0, the neighboring block A1, the neighboring block B0, and the neighboring block B2 of the second prediction block; and if the current coding unit is partitioned into a first prediction block and a second prediction block on left and right sides, and the current prediction block is the second prediction block, the available neighboring blocks of the prediction block include the neighboring block A0, the neighboring block B0, the neighboring block B1, and the neighboring block B2 of the second prediction block.

The processor 42 is further configured to, if the available neighboring blocks are interframe coding blocks, obtain the motion vectors from the available neighboring blocks in a sequence of the neighboring block A1, the neighboring block B1, the neighboring block B0, the neighboring block A0, and the neighboring block B2.

The processor 42 is further configured to determine whether a motion vector of a current available neighboring block is the same as motion vectors of other available neighboring blocks except the current available neighboring block; and if not, add the motion vector of the current available neighboring block to the motion vector list.

The processor 42 is further configured to determine whether a motion vector of a current available neighboring block is the same as motion vectors that have been added to the motion vector list; and if not, add the motion vector of the current available neighboring block to the motion vector list.

The processor 42 is further configured to, if the current available neighboring block is the neighboring block B1, determine whether a motion vector of the neighboring block B1 is the same as a motion vector of the neighboring block A1; if the current available neighboring block is the neighboring block B0, determine whether a motion vector of the neighboring block B0 is the same as the motion vector of the neighboring block B1; if the current available neighboring block is the neighboring block A0, determine whether a motion vector of the neighboring block A0 is the same as the motion vector of the neighboring block A1; and if the current available neighboring block is the neighboring block B2, determine whether a motion vector of the neighboring block B2 is the same as at least one of the motion vector of the neighboring block A1 and the motion vector of the neighboring block B1.

The processor 42 is further configured to, if the current available neighboring block is the neighboring block B1, determine whether a motion vector of the neighboring block B1 is the same as a motion vector of the neighboring block A1 that has been added to the motion vector list; if the current available neighboring block is the neighboring block B0, determine whether a motion vector of the neighboring block B0 is the same as the motion vector of the neighboring block B1 that has been added to the motion vector list; if the current available neighboring block is the neighboring block A0, determine whether a motion vector of the neighboring block A0 is the same as the motion vector of the neighboring block A1 that has been added to the motion vector list; and if the current available neighboring block is the neighboring block B2, determine whether a motion vector of the neighboring block B2 is the same as at least one of the motion vector of the neighboring block A1 that has been added to the motion vector list and the motion vector of the neighboring block B1 that has been added to the motion vector list.

Through the above solution, when a motion vector list of a prediction block is built, the receiver obtains spatial neighboring blocks of the current prediction block first, where the current prediction block is located inside a current coding unit; and the processor determines available neighboring blocks of the current prediction block according to a partition manner of the current coding unit, where the available neighboring blocks are located outside the current coding unit; and obtains motion vectors as the motion vector predictors from the available neighboring blocks in a preset sequence according to motion vectors of the available neighboring blocks, and adds the obtained motion vectors to the motion vector list. In this way, when the motion vector list of the prediction block is built, no neighboring block located inside the current coding unit is considered. When the coding unit includes at least two prediction blocks, motion vector lists of the at least two prediction blocks may be built in a parallel manner, which increases the speed of building the motion vector lists of the at least two prediction blocks in the same coding unit, and improves the parallel processing capability.

Through the foregoing description of the embodiments, a person skilled in the art may clearly understand that the present invention may be implemented by software in addition to necessary universal hardware, and definitely may also be implemented by hardware. However, under most circumstances, the former is preferred. Based on such an understanding, the technical solutions of the present invention essentially, or the part contributing to the prior art may be implemented in the form of a software product. The computer software product is stored in a readable storage medium, for example, a floppy disc, a hard disk, or an optical disc of a computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A method by a coder for building a motion vector list for motion vector prediction, wherein a current coding unit is partitioned into a first prediction block and a second prediction block, on left and right sides, and the current prediction block is the second prediction block on the right side, and the spatial neighboring blocks of the current prediction block comprise: a spatial neighboring block located at a bottom-left side of the current prediction block, a spatial neighboring block located at a left side of the current prediction block, a spatial neighboring block at a top-right side of the current prediction block, a spatial neighboring block at a top side of the current prediction block, and a spatial neighboring block at a top-left side of the current prediction block, wherein the spatial neighboring block is located inside the current coding unit and the method comprising:
   a. adding a motion vector of the spatial neighboring block to the motion vector list when the spatial neighboring block is available;
   b. adding the motion vector of the spatial neighboring block to the motion vector list when the spatial neighboring block is available and the motion vector of the spatial neighboring block is different from the motion vector of the spatial neighboring block;
   c. adding a motion vector of the spatial neighboring block to the motion vector list when the spatial neighboring block is available;
   d. adding the motion vector of the spatial neighboring block to the motion vector list when the spatial neighboring block is available and the motion vector of the spatial neighboring block is different from the motion vector of the spatial neighboring block;
   e. adding a TMVP to the motion vector list when the TMVP is available; and
   wherein the current prediction block is predicated using the motion vector list.

2. An apparatus for building a motion vector list for motion vector prediction, wherein a current coding unit is partitioned into a first prediction block and a second prediction block, on left and right sides, and the current prediction block is the second prediction block on the right side, and the spatial neighboring blocks of the current prediction block comprise: a spatial neighboring block located at a bottom-left side of the prediction block, a spatial neighboring block located at a left side of the prediction block, a spatial neighboring block at a top-right side of the prediction block, a spatial neighboring block at a top side of the prediction block, and a spatial neighboring block at a top-left side of the prediction block, wherein the spatial neighboring block is located inside the current coding unit and the apparatus comprises: a memory storage comprising instructions; and a processor in communication with the memory, wherein the processor execute the instructions to:
   a. add a motion vector of the spatial neighboring block to the motion vector list when the spatial neighboring block is available;
   b. add the motion vector of the spatial neighboring block to the motion vector list when the spatial neighboring block is available and the motion vector of the spatial neighboring block is different from the motion vector of the spatial neighboring block;
   c. add motion vector of the spatial neighboring block to the motion vector list when the spatial neighboring block is available;
   d. add the motion vector of the spatial neighboring block to the motion vector list when the spatial neighboring block is available and the motion vector of the spatial neighboring block is different from the motion vector of the spatial neighboring block;
   e. add a TMVP to the motion vector list when the TMVP is available; and
   wherein the current prediction block is predicated using the motion vector list.

3. A method by a coder for building a motion vector list for motion vector prediction, wherein a current coding unit is partitioned into a first prediction block and a second prediction block, on top and bottom sides, and the current prediction block is the second prediction block on the bottom side, and the spatial neighboring blocks of the current prediction block comprise: a spatial neighboring block located at a bottom-left side of the current prediction block, a spatial neighboring block located at a left side of the current prediction block, a spatial neighboring block at a top-right side of the current prediction block, a spatial neighboring block at a top side of the current prediction block, and a spatial neighboring block at a top-left side of the current prediction block, wherein the spatial neighboring block is located inside the current coding unit and the method comprising:
  a. adding a motion vector of the spatial neighboring block to the motion vector list when the spatial neighboring block is available;
  b. adding the motion vector of the spatial neighboring block to the motion vector list when the spatial neighboring block is available;
  c. adding the motion vector of the spatial neighboring block to the motion vector list when the spatial neighboring block is available and the motion vector of the spatial neighboring block is different from the motion vector of the spatial neighboring block; and
  d. adding the motion vector of the spatial neighboring block to the motion vector list when the spatial neighboring block is available and the motion vector of the spatial neighboring block is different from the motion vector of the spatial neighboring block;
  e. adding a TMVP to the motion vector list when the TMVP is available; and
  wherein the current prediction block is predicated using the motion vector list.

4. An apparatus for building a motion vector list for motion vector prediction, wherein a current coding unit is partitioned into a first prediction block and a second prediction block, on top and bottom sides, and the current prediction block is the second prediction block on the bottom side, and the spatial neighboring blocks of the current prediction block comprise: a spatial neighboring block located at a bottom-left side of the current prediction block, a spatial neighboring block located at a left side of the current prediction block, a spatial neighboring block at a top-right side of the current prediction block, a spatial neighboring block at a top side of the current prediction block, and a spatial neighboring block at a top-left side of the current prediction block, wherein the spatial neighboring block is located inside the current coding unit and the apparatus comprises: a memory storage comprising instructions, and a processor in communication with the memory, wherein the processor execute the instructions to:
  a. add a motion vector of the spatial neighboring block to the motion vector list when the spatial neighboring block is available;
  b. add the motion vector of the spatial neighboring block to the motion vector list when the spatial neighboring block is available;
  c. add the motion vector of the spatial neighboring block to the motion vector list when the spatial neighboring block is available and the motion vector of the spatial neighboring block is different from the motion vector of the spatial neighboring block;
  d. add the motion vector of the spatial neighboring block to the motion vector list when the spatial neighboring block is available and the motion vector of the spatial neighboring block is different from the motion vector of the spatial neighboring block;
  e. add a TMVP to the motion vector list when the TMVP is available; and
  wherein the current prediction block is predicated using the motion vector list.

* * * * *

UNITED STATES PATENT AND TRADEMARK OFFICE
CERTIFICATE OF CORRECTION

Page 1 of 4

PATENT NO. : 10,511,854 B2
APPLICATION NO. : 16/054750
DATED : December 17, 2019
INVENTOR(S) : Yongbing Lin It is certified that error appears in the above-identified patent and that said Letters Patent is hereby corrected as shown below:

In the Claims

Claim 1, Column 11, Lines 53-60: "a spatial neighboring block located at a bottom-left side of the current prediction block, a spatial neighboring block located at a left side of the current prediction block, a spatial neighboring block at a top-right side of the current prediction block, a spatial neighboring block at a top side of the current prediction block, and a spatial neighboring block at a top-left side of the current prediction block" should read "a spatial neighboring block (A0) located at a bottom-left side of the current prediction block, a spatial neighboring block (A1) located at a left side of the current prediction block, a spatial neighboring block (B0) at a top-right side of the current prediction block, a spatial neighboring block (B1) at a top side of the current prediction block, and a spatial neighboring block (B2) at a top-left side of the current prediction block";

Claim 1, Column 11, Lines 60-61: "wherein the spatial neighboring block is located inside the current coding unit" should read "wherein the spatial neighboring block (A1) is located inside the current coding unit";

Claim 1, Column 11, Lines 63-64: "a. adding a motion vector of the spatial neighboring block to the motion vector list when the spatial neighboring block is available" should read "a. adding a motion vector of the spatial neighboring block (B1) to the motion vector list when the spatial neighboring block (B1) is available";

Claim 1, Column 11, Line 66 to Column 12, Line 3: "b. adding the motion vector of the spatial neighboring block to the motion vector list when the spatial neighboring block is available and the motion vector of the spatial neighboring block is different from the motion vector of the spatial neighboring block" should read "b. adding the motion vector of the spatial neighboring block (B0) to the motion vector list when the spatial neighboring block (B0) is available and the motion vector of the spatial neighboring block (B0) is different from the motion vector of the spatial neighboring block (B1)";

Claim 1, Column 12, Lines 4-6: "c. adding a motion vector of the spatial neighboring block to the motion vector list when the spatial neighboring block is available" should read "c. adding a motion vector of the spatial neighboring block (A0) to the motion vector list when the spatial neighboring block (A0) is available";

Signed and Sealed this
Fifth Day of May, 2020

Andrei Iancu
*Director of the United States Patent and Trademark Office*

Claim 1, Column 12, Lines 7-11: "d. adding the motion vector of the spatial neighboring block to the motion vector list when the spatial neighboring block is available and the motion vector of the spatial neighboring block is different from the motion vector of the spatial neighboring block" should read "d. adding the motion vector of the spatial neighboring block (B2) to the motion vector list when the spatial neighboring block (B2) is available and the motion vector of the spatial neighboring block (B2) is different from the motion vector of the spatial neighboring block (B1)".

Claim 2, Column 12, Lines 23-30: "a spatial neighboring block located at a bottom-left side of the current prediction block, a spatial neighboring block located at a left side of the current prediction block, a spatial neighboring block at a top-right side of the current prediction block, a spatial neighboring block at a top side of the current prediction block, and a spatial neighboring block at a top-left side of the current prediction block" should read "a spatial neighboring block (A0) located at a bottom-left side of the current prediction block, a spatial neighboring block (A1) located at a left side of the current prediction block, a spatial neighboring block (B0) at a top-right side of the current prediction block, a spatial neighboring block (B1) at a top side of the current prediction block, and a spatial neighboring block (B2) at a top-left side of the current prediction block";
Claim 2, Column 12, Lines 30-31: "wherein the spatial neighboring block is located inside the current coding unit" should read "wherein the spatial neighboring block (A1) is located inside the current coding unit";
Claim 2, Column 12, Lines 35-37: "a. add a motion vector of the spatial neighboring block to the motion vector list when the spatial neighboring block is available" should read "a. add a motion vector of the spatial neighboring block (B1) to the motion vector list when the spatial neighboring block (B1) is available";
Claim 2, Column 12, Lines 38-42: "b. add the motion vector of the spatial neighboring block to the motion vector list when the spatial neighboring block is available and the motion vector of the spatial neighboring block is different from the motion vector of the spatial neighboring block" should read "b. add the motion vector of the spatial neighboring block (B0) to the motion vector list when the spatial neighboring block (B0) is available and the motion vector of the spatial neighboring block (B0) is different from the motion vector of the spatial neighboring block (B1)";
Claim 2, Column 12, Lines 43-45: "c. add a motion vector of the spatial neighboring block to the motion vector list when the spatial neighboring block is available" should read "c. add a motion vector of the spatial neighboring block (A0) to the motion vector list when the spatial neighboring block (A0) is available";
Claim 2, Column 12, Lines 46-50: "d. add the motion vector of the spatial neighboring block to the motion vector list when the spatial neighboring block is available and the motion vector of the spatial neighboring block is different from the motion vector of the spatial neighboring block" should read "d. add the motion vector of the spatial neighboring block (B2) to the motion vector list when the spatial neighboring block (B2) is available and the motion vector of the spatial neighboring block (B2) is different from the motion vector of the spatial neighboring block (B1)".

Claim 3, Column 12, Line 61 to Column 13, Line 1: "a spatial neighboring block located at a bottom-left side of the current prediction block, a spatial neighboring block located at a left side of the current prediction block, a spatial neighboring block at a top-right side of the current prediction block, a spatial neighboring block at a top side of the current prediction block, and a spatial neighboring block at a top-left side of the current prediction block" should read "a spatial neighboring block (A0) located at a bottom-left side of the current prediction block, a spatial neighboring block (A1) located at a left side of the current prediction block, a spatial neighboring block (B0) at a top-right side of the current prediction block, a spatial neighboring block (B1) at a top side of the current prediction block, and a spatial neighboring block (B2) at a top-left side of the current prediction block";

Claim 3, Column 13, Lines 1-2: "wherein the spatial neighboring block is located inside the current coding unit" should read "wherein the spatial neighboring block (B1) is located inside the current coding unit";

Claim 3, Column 13, Lines 4-6: "a. adding a motion vector of the spatial neighboring block to the motion vector list when the spatial neighboring block is available" should read "a. adding a motion vector of the spatial neighboring block (A1) to the motion vector list when the spatial neighboring block (A1) is available";

Claim 3, Column 13, Lines 7-9: "b. adding the motion vector of the spatial neighboring block to the motion vector list when the spatial neighboring block is available" should read "b. adding the motion vector of the spatial neighboring block (B0) to the motion vector list when the spatial neighboring block (B0) is available";

Claim 3, Column 13, Lines 10-14: "c. adding the motion vector of the spatial neighboring block to the motion vector list when the spatial neighboring block is available and the motion vector of the spatial neighboring block is different from the motion vector of the spatial neighboring block" should read "c. adding the motion vector of the spatial neighboring block (A0) to the motion vector list when the spatial neighboring block (A0) is available and the motion vector of the spatial neighboring block (A0) is different from the motion vector of the spatial neighboring block (A1)";

Claim 3, Column 13, Lines 15-19: "d. adding the motion vector of the spatial neighboring block to the motion vector list when the spatial neighboring block is available and the motion vector of the spatial neighboring block is different from the motion vector of the spatial neighboring block" should read "d. adding the motion vector of the spatial neighboring block (B2) to the motion vector list when the spatial neighboring block (B2) is available and the motion vector of the spatial neighboring block (B2) is different from the motion vector of the spatial neighboring block (A1)".

Claim 4, Column 13, Line 31 to Column 14, Line 6: "a spatial neighboring block located at a bottom-left side of the current prediction block, a spatial neighboring block located at a left side of the current prediction block, a spatial neighboring block at a top-right side of the current prediction block, a spatial neighboring block at a top side of the current prediction block, and a spatial neighboring block at a top-left side of the current prediction block" should read "a spatial neighboring block (A0) located at a bottom-left side of the current prediction block, a spatial neighboring block (A1) located at a left side of the current prediction block, a spatial neighboring block (B0) at a top-right side of the current prediction block, a spatial neighboring block (B1) at a top side of the current prediction block, and a spatial neighboring block (B2) at a top-left side of the current prediction block";

Claim 4, Column 14, Lines 6-7: "wherein the spatial neighboring block is located inside the current coding unit" should read "wherein the spatial neighboring block (B1) is located inside the current coding unit";

Claim 4, Column 14, Lines 11-13: "a. add a motion vector of the spatial neighboring block to the motion vector list when the spatial neighboring block is available" should read "a. add a motion vector of the spatial neighboring block (A1) to the motion vector list when the spatial neighboring block (A1) is available";

Claim 4, Column 14, Lines 14-16: "b. add the motion vector of the spatial neighboring block to the motion vector list when the spatial neighboring block is available" should read "b. add the motion vector of the spatial neighboring block (B0) to the motion vector list when the spatial neighboring

CERTIFICATE OF CORRECTION (continued)
U.S. Pat. No. 10,511,854 B2 block (B0) is available";

Claim 4, Column 14, Lines 17-21: "c. add the motion vector of the spatial neighboring block to the motion vector list when the spatial neighboring block is available and the motion vector of the spatial neighboring block is different from the motion vector of the spatial neighboring block" should read "c. add the motion vector of the spatial neighboring block (A0) to the motion vector list when the spatial neighboring block (A0) is available and the motion vector of the spatial neighboring block (A0) is different from the motion vector of the spatial neighboring block (A1)";

Claim 4, Column 14, Lines 22-26: "d. add the motion vector of the spatial neighboring block to the motion vector list when the spatial neighboring block is available and the motion vector of the spatial neighboring block is different from the motion vector of the spatial neighboring block" should read "d. add the motion vector of the spatial neighboring block (B2) to the motion vector list when the spatial neighboring block (B2) is available and the motion vector of the spatial neighboring block (B2) is different from the motion vector of the spatial neighboring block (A1)".